(12) United States Patent
Ou et al.

(10) Patent No.: US 11,680,793 B2
(45) Date of Patent: Jun. 20, 2023

(54) METHOD FOR DETECTING THICKNESS OF TREE CANOPY BASED ON ULTRASONIC ECHO SIGNAL

(71) Applicant: Jiangsu University, Jiangsu (CN)

(72) Inventors: Mingxiong Ou, Jiangsu (CN); Ming Wang, Jiangsu (CN); Weidong Jia, Jiangsu (CN); Huitao Zhou, Jiangsu (CN); Shiqun Dai, Jiangsu (CN); Shuai Yang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 25 days.

(21) Appl. No.: 17/627,693

(22) PCT Filed: Aug. 5, 2021

(86) PCT No.: PCT/CN2021/110817
§ 371 (c)(1),
(2) Date: Jan. 17, 2022

(87) PCT Pub. No.: WO2022/017539
PCT Pub. Date: Jan. 27, 2022

(65) Prior Publication Data
US 2022/0364856 A1 Nov. 17, 2022

(30) Foreign Application Priority Data
Jul. 24, 2020 (CN) .......................... 202010725096.3

(51) Int. Cl.
*G01B 17/02* (2006.01)
(52) U.S. Cl.
CPC .................................... *G01B 17/02* (2013.01)
(58) Field of Classification Search
CPC ......... G01B 17/02; G01S 7/539; G01S 15/10; G01S 15/88
See application file for complete search history.

(56) References Cited

U.S. PATENT DOCUMENTS

| 4,624,127 A * | 11/1986 | Narushima | ............ | G01B 17/02 |
| | | | | 73/610 |
| 2023/0081764 A1* | 3/2023 | Crowe | .................... | G01S 15/86 |
| | | | | 367/87 |

FOREIGN PATENT DOCUMENTS

| CN | 104062644 | 9/2014 |
| CN | 104199042 | 12/2014 |

(Continued)

OTHER PUBLICATIONS

"International Search Report (Form PCT/ISA/210) of PCT/CN2021/110817," dated Oct. 28, 2021, pp. 1-5.

(Continued)

*Primary Examiner* — Tarun Sinha
(74) *Attorney, Agent, or Firm* — JCIPRNET

(57) ABSTRACT

The present invention relates to a method for detecting a thickness of a tree canopy based on an ultrasonic echo signal, and belongs to the technical field of agricultural machinery information sensing and detection. The present invention analyzes and discriminates a first effective peak and a last effective peak of the ultrasonic echo signal, obtains a first effective peak time and a last effective peak time, and calculates the thickness of the tree canopy according to a provided calculation formula, thus realizing the direct detection of the thickness of the tree canopy. This method has characteristics such as a high accuracy and a wide application range, and is applicable to the field of detection of the thickness of a tree canopy in industries such as agricultural machinery and forestry machinery.

5 Claims, 3 Drawing Sheets

(56) References Cited

FOREIGN PATENT DOCUMENTS

| | | |
|---|---|---|
| CN | 105866792 | 8/2016 |
| CN | 110506723 | 11/2019 |
| CN | 111781605 | 10/2020 |
| DE | 102010033213 | 2/2012 |
| JP | 2010096752 | 4/2010 |

OTHER PUBLICATIONS

"Written Opinion of the International Searching Authority (Form PCT/ISA/237) of PCT/CN2021/110817," dated Oct. 28, 2021, pp. 1-5.

* cited by examiner

METHOD FOR DETECTING THICKNESS OF TREE CANOPY BASED ON ULTRASONIC ECHO SIGNAL

CROSS-REFERENCE TO RELATED APPLICATION

This application is a 371 of international application of PCT application serial no. PCT/CN2021/110817, filed on Aug. 05, 2021, which claims the priority benefit of China application no. 202010725096.3, filed on Jul. 24, 2020. The entirety of each of the above mentioned patent applications is hereby incorporated by reference herein and made a part of this specification.

TECHNICAL FIELD

The present invention relates to a method for detecting the thickness of the tree canopy based on the ultrasonic echo signal, and belongs to the technical field of sensing and detection of agricultural information. Specifically, the present invention relates to a technology suitable for sensing and detecting the thickness of the tree canopy by using an ultrasonic sensor.

BACKGROUND

During operations of intelligent agricultural machineries such as variable-rate sprayers in orchards, in order to achieve precise adjustment of operating parameters, real-time sensing and detection of the thickness of the tree canopy is required.

At present, conventional methods for sensing and detecting the thickness of the tree canopy mainly use distance measurement principles of infrared, ultrasonic, and laser. On the one hand, it is assumed that a distance between the agricultural machinery and the center of a tree canopy remains unchanged, and it is also assumed that the tree canopy is distributed symmetrically. On this basis, an infrared sensor, an ultrasonic sensor, and a laser sensor are used to detect the distance between the machinery and the tree canopy, so as to indirectly calculate the thickness of the tree canopy in the detection direction, thus providing information for spray application and other operations.

At present, the conventional method for sensing and detecting the thickness of the tree canopy has the following problems. First, in an actual operation process, the distance between the agricultural machinery and the tree canopy center is constantly changing, while it is assumed in the conventional method that the distance is unchanged, thus introducing a large error in the calculation of the thickness of the tree canopy. Second, the method is suitable for spindle-shaped fruit trees with good symmetry, and has poor applicability to fruit trees with asymmetrical tree canopies such as hedge-shaped fruit trees.

SUMMARY

The present invention provides a method for detecting a thickness of a tree canopy based on an ultrasonic echo signal. By using an ultrasonic sensor with advantages such as good reliability, strong applicability, fast signal response, and low cost, the present invention proposes a method for detecting a thickness of a tree canopy directly through an ultrasonic echo signal. The method is suitable for various fruit trees such as spindle-shaped and hedge-shaped fruit trees, and has characteristics of a high accuracy and a wide application range.

The technical solution of the present invention is the following.

An ultrasonic sensor sends an ultrasonic emission signal toward a tree canopy, the tree canopy reflects the ultrasonic emission signal to form an ultrasonic echo signal, and the ultrasonic echo signal is acquired, where the ultrasonic echo signal is composed of voltage data and corresponding time data thereof. The voltage data generates an array $V_i=[V_1, V_2, V_3, \ldots, V_n]$, the corresponding time data generates an array $T=[T_1, T_2, T_3, \ldots, T_n]$, and $i=1, 2, 3, \ldots, n$. Detection and calculation of the thickness of the tree canopy are performed according to the array V and the array T, including the following specific steps.

Step 1: acquiring a first effective peak and a first effective peak time from the ultrasonic echo signal: discriminating $V_i$ in the array V sequentially starting from i=2; as i gradually increases, when a first $V_i$ meets both $V_i > V_{i-1}$ and $V_i > \text{MAX}(V_{i+1}, V_{i+2}, \ldots, V_{i+m})$, setting the first $V_i$ as the first effective peak $V_x$ of the ultrasonic echo signal, and setting time data corresponding to the $V_x$ as the first effective peak time $T_x$;

where i is 2, 3, 4, ..., n; $\text{MAX}(V_{i+1}, V_{i+2}, V_{i+m})$ is a maximum value in an array $[V_{i+1}, V_{i+2}, V_{i+m}]$; m is an effective number of the first effective peak, $m=k_1 f$, $k_1$ is a sampling duration, and $k_1=0.001-0.0005$, in seconds; and f is a sampling frequency of the ultrasonic echo signal, in hertz.

Step 2: acquiring a last effective peak and a last effective peak time from the ultrasonic echo signal: discriminating $V_j$ in the array V sequentially starting from j=n−1; as j gradually decreases, when a first $V_j$ meets both $V_j > \text{MAX}(V_{j-1}, V_{j-2}, \ldots, V_{j-s})$ and $V_j > \text{MAX}(V_{j+1}, \ldots, V_n)$, setting the first $V_j$ as the last effective peak $V_y$ of the ultrasonic echo signal, and setting time data corresponding to the $V_y$ as the last effective peak time $T_y$;

where j is 1, 2, 3, ..., n−1; $\text{MAX}(V_{j-1}, V_{j-2}, \ldots, V_{j-s})$ is a maximum value in an array $[V_{j-1}, V_{j-2}, \ldots, V_{j-s}]$ and $\text{MAX}(V_{j+1}, \ldots, V_n)$ is a maximum value in an array $[V_{j+1}, \ldots, V_n]$; s is an effective number of the last effective peak, $s=k_2 f$, $k_2$ is a sampling duration, and $k_2=0.0005-0.0001$, in seconds; and f is the sampling frequency of the ultrasonic echo signal, in hertz.

Step 3: according to the first effective peak time $T_x$ acquired in step 1 and the last effective peak time $T_y$ acquired in step 2, obtaining a calculation formula of the thickness L of the tree canopy as follows:

$$L = k \frac{v_o (T_y - T_x)}{2}$$

where L is the thickness of the tree canopy, in meters; $v_o$ is a local ultrasonic propagation rate, in meters/second; $T_x$ is the first effective peak time of the ultrasonic echo signal, in seconds; $T_y$ is the last effective peak time of the ultrasonic echo signal, in seconds; k is a correction coefficient, and when a leaf area index (LAI) of the tree canopy meets 1.5≤LAI≤4.0, k=1; when the leaf area index of the tree canopy is $$LAI < 1.5, k = \frac{|LAI - 1.5|}{3} + 1;$$

and when the leaf area index of the tree canopy is $$LAI > 4, k = \frac{|LAI - 4|}{2} + 1.$$

The beneficial effects of the present invention: By means of the method provided by the present invention, the ultrasonic echo signal can be directly used to calculate the value of the thickness of a tree canopy, without considering the distance between an agricultural machinery and the tree canopy. At the same time, there is no requirement on a shape of the tree, and thus the method provided by the present invention is applicable to detect the thickness of tree canopies of different trees under a variety of operating conditions.

BRIEF DESCRIPTION OF THE DRAWINGS

The present invention will be further described below with reference to accompanying drawings and embodiments, wherein.

DETAILED DESCRIPTION OF THE EMBODIMENTS

The technical solutions of the present invention will be clearly and completely described below with reference to the accompanying drawings in the embodiments of the present invention.

Figure 1:
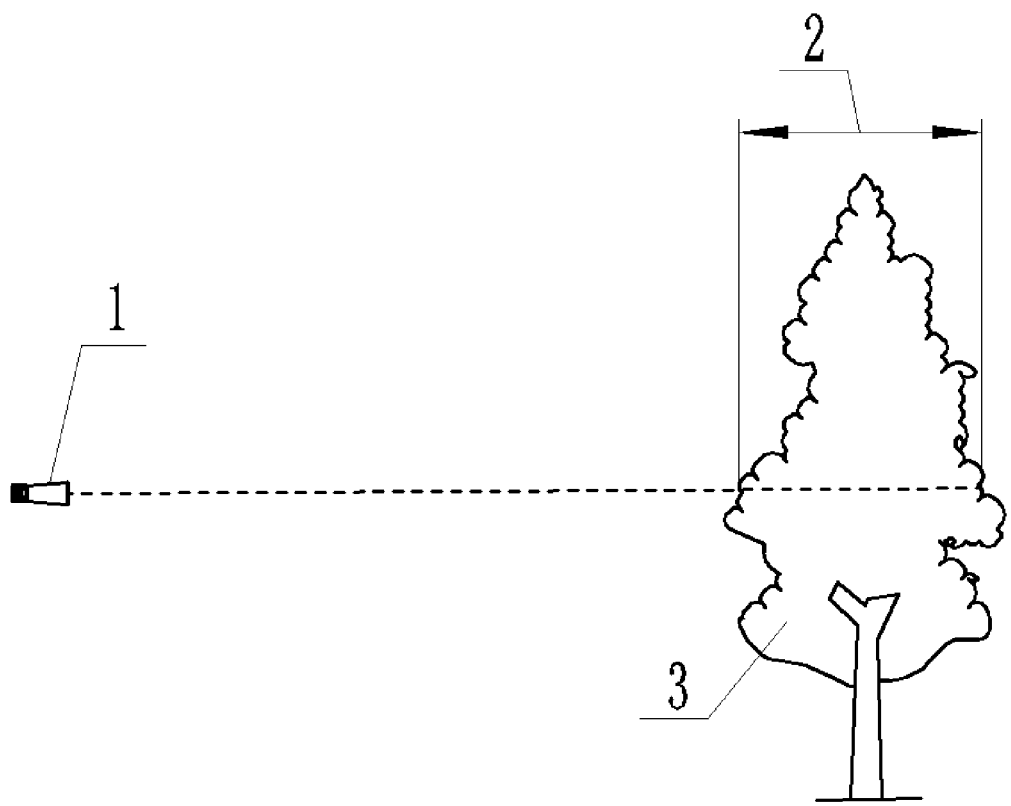
FIG. 1 is a schematic diagram of a solution for detecting the thickness of a tree canopy using an ultrasonic sensor according to an embodiment of the present invention.

As shown in FIG. 1, it is a schematic diagram of a solution for detecting the thickness of a tree canopy using an ultrasonic sensor according to an embodiment of the present invention. The ultrasonic sensor 1 sends an ultrasonic emission signal 4 toward a tree canopy 3, the tree canopy 3 reflects the ultrasonic emission signal to form an ultrasonic echo signal 5, and the thickness 2 of the tree canopy in the detection direction of the ultrasound emitted by the ultrasonic sensor 1 is shown in FIG. 1.

Figure 2:
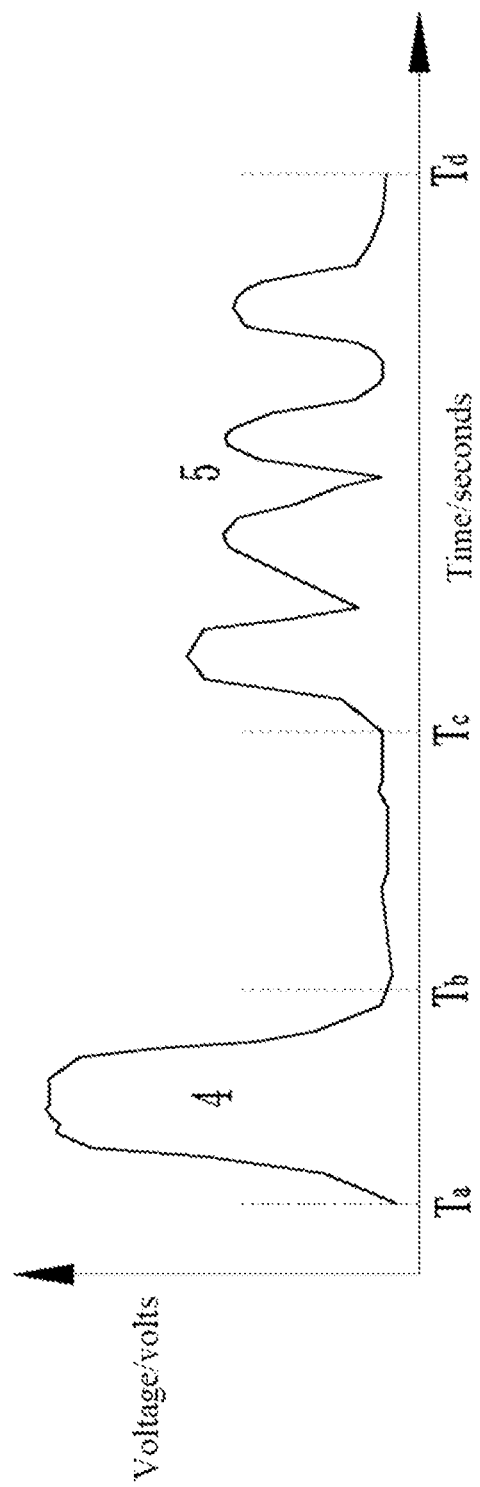
FIG. 2 is a schematic diagram of an ultrasonic emission signal and an ultrasonic echo signal according to an embodiment of the present invention.

A typical ultrasonic emission signal 4 and ultrasonic echo signal 5 are shown in FIG. 2. The ultrasonic emission signal 4 and ultrasonic echo signal 5 each are composed of voltage data within a certain period of time, and corresponding time data thereof. The ultrasonic emission signal 4 is composed of voltage data between time $T_a$ and time $T_b$, and corresponding time data thereof, and the ultrasonic echo signal 5 is composed of voltage data between time $T_c$ and time $T_d$, and corresponding time data thereof.

Figure 3:
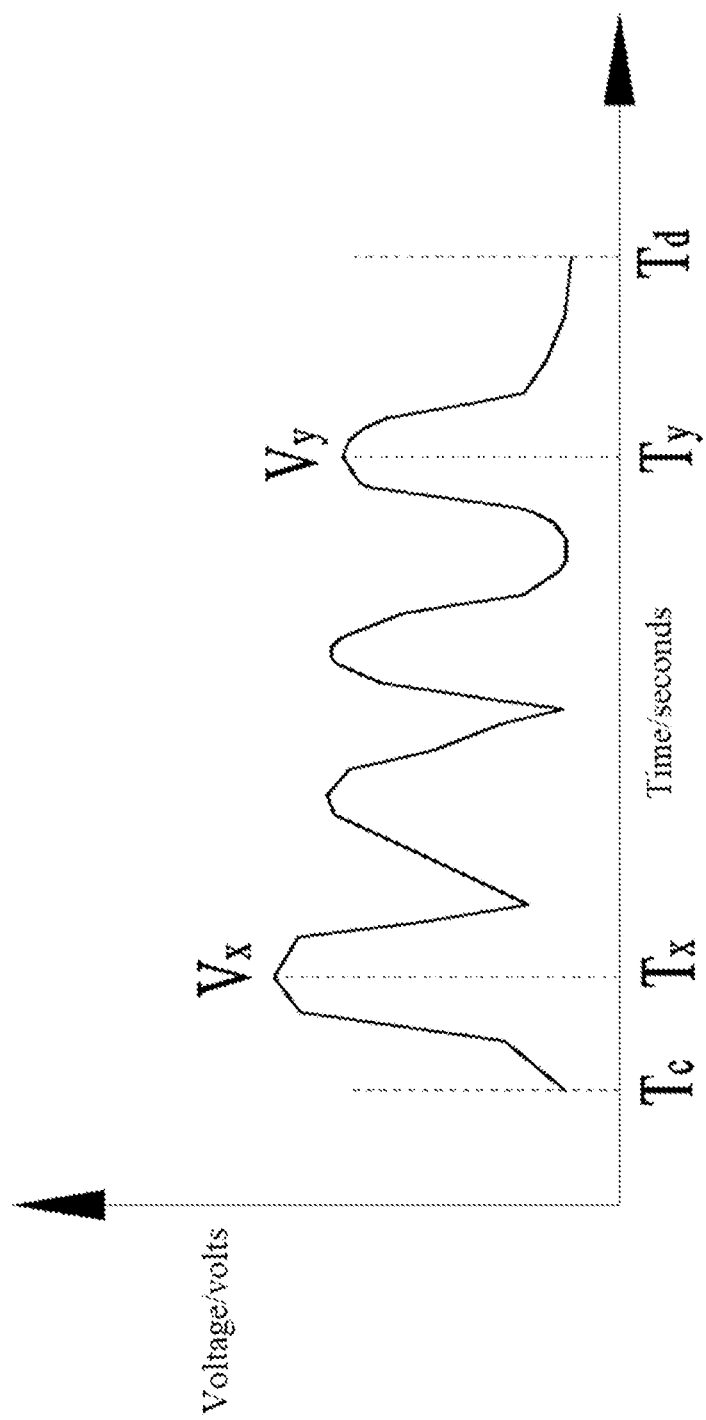
FIG. 3 is a schematic diagram of an ultrasonic echo signal according to an embodiment of the present invention.

The typical ultrasonic echo signal 5 is shown in FIG. 3, and the ultrasonic echo signal 5 is composed of the voltage data between the time $T_c$ and the time $T_d$. The voltage data generates an array $V=[V_1; V_2; V_3; \ldots ; V_n]$, the time data generates an array $T=[T_1; T_2; T_3; \ldots ; T_n]$, and i=1, 2, 3, . . . , n.

On the basis of the above, the detection and calculation of the thickness 2 of the tree canopy are performed according to the array V and the array T, and specific steps are as follows.

In step 1, the first effective peak and the first effective peak time are acquired from the ultrasonic echo signal: Starting from i=2, $V_i$ in the array V is sequentially discriminated. As i gradually increases, when a first $V_i$ meets both $V_i > V_{i-1}$ and $V_i > MAX(V_{i+1}, V_{i+2}, \ldots, V_{i+m})$, the first $V_i$ is set as the first effective peak $V_x$ of the ultrasonic echo signal, and the time data corresponding to the $V_x$ is set as the first effective peak time $T_x$, as shown in FIG. 3.

Where i is 2, 3, 4, . . . , n, $MAX(V_{i+1}, V_{i+2}, \ldots, V_{i+m})$ is the maximum value in the array $[V_{i+1}, V_{i+2}, \ldots, V_{i+m}]$, m is the effective number of the first effective peak, $m=k_1 f$, $k_1$ is a sampling duration, and $k_1=0.001$-$0.0005$, in seconds; and f is a sampling frequency of the ultrasonic echo signal, in hertz.

In step 2, the last effective peak and the last effective peak time are acquired from the ultrasonic echo signal: Starting from j=n−1, $V_j$ in the array V is sequentially discriminated. As j gradually decreases, when a first $V_j$ meets both $V_j > MAX(V_{j-1}, V_{j-2}, \ldots, V_{j-s})$ and $V_j > MAX(V_{j+1}, \ldots, V_n)$, the first $V_j$ is set as the last effective peak $V_y$ of the ultrasonic echo signal, and the time data corresponding to the $V_y$ is set as the last effective peak time $T_y$, as shown in FIG. 3.

Where j is 1, 2, 3, . . . , n−1; $MAX(V_{j-1}, V_{j-2}, \ldots, V_{j-s})$ is the maximum value in the array $[V_{j-1}, V_{j-2}, \ldots, V_{j-s}]$, and $MAX(V_{j+1}, \ldots, V_n)$ is the maximum value in the array $[V_{j+1}, \ldots, V_n]$, s is the effective number of the last effective peak, $s=k_2 f$, $k_2$ is a sampling duration, and $k_2=0.0005$-$0.0001$, in seconds; and f is the sampling frequency of the ultrasonic echo signal, in hertz.

In step 3, according to the first effective peak time $T_x$ acquired in step 1 and the last effective peak time $T_y$ acquired in step 2, a calculation formula of the thickness L of the tree canopy is obtained as follows:

$$L = k \frac{v_o (T_y - T_x)}{2}$$

where L is the thickness of the tree canopy, in meters; $v_o$ is a local ultrasonic propagation rate, in meters/second; $T_x$ is the first effective peak time of the ultrasonic echo signal, in seconds; $T_y$ is the last effective peak time of the ultrasonic echo signal, in seconds; k is a correction coefficient. When a leaf area index LAI of the tree canopy meets $1.5 \leq LAI \leq 4.0$, k=1. When the leaf area index of the tree canopy is $$LAI < 1.5, k = \frac{|LAI - 1.5|}{3} + 1.$$

When the leaf area index of the tree canopy is $$LAI > 4, k = \frac{|LAI - 4|}{2} + 1.$$

When the leaf area index LAI of the tree canopy is 3, the correction coefficient k=1, the local ultrasonic propagation rate $v_o=340$ meters/second, the sampling frequency of the ultrasonic echo signal is f=400000 Hz, the sampling duration $k_1=0.001$ seconds, and the sampling duration $k_2=0.0005$ seconds. According to the method provided in the above embodiment, the thickness L of the tree canopy is detected, and the comparison between the detected thickness L of the tree canopy and the actual thickness LO of the tree canopy is shown in Table 1.

TABLE 1

Comparison between the embodiment of the present invention and the actual thickness of the tree canopy

| Thickness L of the tree canopy (m) | Actual thickness LO of the tree canopy (m) | Relative error δ (%) |
| --- | --- | --- |
| 0.29 | 0.30 | −3.3 |
| 0.42 | 0.40 | 5.0 |
| 0.52 | 0.50 | 4.0 |
| 0.57 | 0.60 | −5.0 |

As shown in Table 1, the value of the thickness L of the tree canopy obtained in the embodiment of the present invention is very close to the value of the actual thickness LO of the tree canopy, with the relative error δ between 3% and 5%. The result shows that the present invention has a characteristic of high accuracy, and is especially suitable for the detection of various fruit trees in mountainous and hilly areas.

The relative error δ is defined as $$\delta = 100 \times \frac{|L - LO|}{LO},$$

where δ is the relative error, in %. L is the thickness of the tree canopy, in meters, and LO is the actual thickness of the tree canopy, in meters.

What is claimed is:

1. A method for detecting a thickness of a tree canopy based on an ultrasonic echo signal, comprising:
   sending, by an ultrasonic sensor, an ultrasonic emission signal toward the tree canopy;
   forming the ultrasonic echo signal by the tree canopy reflecting the ultrasonic emission signal; and
   acquiring the ultrasonic echo signal, the ultrasonic echo signal being composed of voltage data and corresponding time data thereof,
   wherein the voltage data generates an array $V_i = [V_1, V_2, V_3, \ldots, V_n]$, the corresponding time data generates an array $T = [T_1, T_2, T_3, \ldots, T_n]$, $i = 1, 2, 3, \ldots, n$, and a calculation formula of the thickness L of the tree canopy is as follows:

$$L = k \frac{v_o(T_y - T_x)}{2}$$

wherein L is the thickness of the tree canopy, in meters, $v_o$ is a local ultrasonic propagation rate, in meters/second, $T_x$ is a first effective peak time of the ultrasonic echo signal, in seconds, $T_y$ is a last effective peak time of the ultrasonic echo signal, in seconds, k is a correction coefficient, when a leaf area index (LAI) of the tree canopy meets 1.5≤LAI≤4.0, k=1, when the leaf area index of the tree canopy is $$LAI < 1.5, k = \frac{|LAI - 1.5|}{3} + 1,$$

and when the leaf area index of the tree canopy is $$LAI > 4, k = \frac{|LAI - 4|}{2} + 1.$$

2. The method for detecting the thickness of the tree canopy based on the ultrasonic echo signal according to claim 1, wherein the first effective peak time of the ultrasonic echo signal is acquired by:
   discriminating $V_i$ in the array V sequentially starting from $i=2$, as i gradually increases, when a first $V_i$ meets both $V_i > V_{i-1}$ and $V_i > MAX(V_{i+1}, V_{i+2} \ldots, V_{i+m})$;
   setting the first $V_i$ as a first effective peak $V_x$ of the ultrasonic echo signal; and
   setting time data corresponding to the $V_x$ as the first effective peak time $T_x$,
   wherein i is 2, 3, 4, ..., n, $MAX(V_{i+1}, V_{i+2}, \ldots, V_{i+m})$ is a maximum value in an array $[V_{i+1}, V_{i+2}, \ldots, V_{i+m}]$, and m is an effective number of the first effective peak.

3. The method for detecting the thickness of the tree canopy based on the ultrasonic echo signal according to claim 2, wherein
   the effective number of the first effective peak is $m = k_1 f$, $k_1$ is a sampling duration, and $k_1 = 0.001$-$0.0005$, in seconds, and f is a sampling frequency of the ultrasonic echo signal, in hertz.

4. The method for detecting the thickness of the tree canopy based on the ultrasonic echo signal according to claim 1, wherein the last effective peak time of the ultrasonic echo signal is acquired by:
   discriminating $V_j$ in the array V sequentially starting from $j = n-1$, as j gradually decreases, when a first $V_j$ meets both $V_j > MAX(V_{j-1}, V_{j-2}, \ldots, V_{j-s})$ and $V_j > MAX(V_{j+1}, \ldots, V_n)$;
   setting the first $V_j$ as a last effective peak $V_y$ of the ultrasonic echo signal; and
   setting time data corresponding to the $V_y$ as the last effective peak time $T_y$,
   wherein j is 1, 2, 3, ..., n−1, $MAX(V_{j-i}, V_{j-2}, \ldots, V_{j-s})$ is a maximum value in an array $[V_{j-i}, V_{j-2}, \ldots, V_{j-s}]$, and $MAX(V_{j+1}, \ldots, V_n)$ is a maximum value in an array $[V_{j+1}, \ldots, V_n]$, and s is an effective number of the last effective peak.

5. The method for detecting the thickness of the tree canopy based on the ultrasonic echo signal according to claim 4, wherein
   the effective number of the last effective peak is $s = k_2 f$, $k_2$ is a sampling duration, and $k_2 = 0.0005$-$0.0001$, in seconds, and f is a sampling frequency of the ultrasonic echo signal, in hertz.

* * * * *